(12) United States Patent
Jai et al.

(10) Patent No.: US 8,356,085 B2
(45) Date of Patent: Jan. 15, 2013

(54) AUTOMATED TRANSFORMATION OF SPECIFICATIONS FOR DEVICES INTO EXECUTABLE MODULES

(75) Inventors: Ben Jai, Scotch Plains, NJ (US); Gokul Chander Prabhakar, Somerset, NJ (US); Rajeev Rastogi, New Providence, NJ (US)

(73) Assignee: Alcatel Lucent, Paris (FR)

( * ) Notice: Subject to any disclaimer, the term of this patent is extended or adjusted under 35 U.S.C. 154(b) by 2302 days.

(21) Appl. No.: 10/600,995

(22) Filed: Jun. 20, 2003

(65) Prior Publication Data

US 2005/0021686 A1 Jan. 27, 2005

(51) Int. Cl.
*G06F 15/177* (2006.01)
(52) U.S. Cl. ........................................ 709/220
(58) Field of Classification Search .......... 709/220–222, 709/230
See application file for complete search history.

(56) References Cited

U.S. PATENT DOCUMENTS

| | | | | |
|---|---|---|---|---|
| 6,286,038 B1* | 9/2001 | Reichmeyer et al. | ........ | 709/220 |
| 6,934,696 B1* | 8/2005 | Williams et al. | ........ | 706/47 |
| 7,143,151 B1* | 11/2006 | Kayashima et al. | ........ | 709/220 |
| 7,155,534 B1* | 12/2006 | Meseck et al. | ........ | 709/220 |
| 7,185,192 B1* | 2/2007 | Kahn | ........ | 713/155 |
| 2001/0047385 A1* | 11/2001 | Tuatini | ........ | 709/222 |
| 2002/0120720 A1* | 8/2002 | Moir | ........ | 709/220 |
| 2003/0065405 A1* | 4/2003 | Zhong | ........ | 700/1 |
| 2003/0105838 A1* | 6/2003 | Presley | ........ | 709/220 |
| 2003/0115548 A1* | 6/2003 | Melgar | ........ | 715/513 |
| 2003/0135609 A1* | 7/2003 | Carlson et al. | ........ | 709/221 |
| 2004/0015571 A1* | 1/2004 | Miyazaki et al. | ........ | 709/220 |
| 2004/0015832 A1* | 1/2004 | Stapp et al. | ........ | 717/106 |

\* cited by examiner

*Primary Examiner* — Benjamin R Bruckart
(74) *Attorney, Agent, or Firm* — Ryan, Mason & Lewis, LLP

(57) ABSTRACT

A number of configuration elements are associated with a number of devices. Information about input configuration elements is accessed. An input configuration element is associated with one or more input rules. It is determined which of the configuration elements could be accessed by the input rules and any call chains emanating from the rules. Output rules are determined by using the accessed configuration elements, the input rules, and the way the input rule manipulates its accessed configuration elements. Each output rule may be derived from an input rule and corresponds to the same input configuration element associated with that input rule. An executable module is generated that is adapted to access at least a given one of the input configuration elements and to trigger one or more of the output rules corresponding to the given input configuration element. Read and write sets for rules are determined, and the triggered output rules ensure that restrictions associated with a configuration element are not violated.

21 Claims, 8 Drawing Sheets

FIG. 2

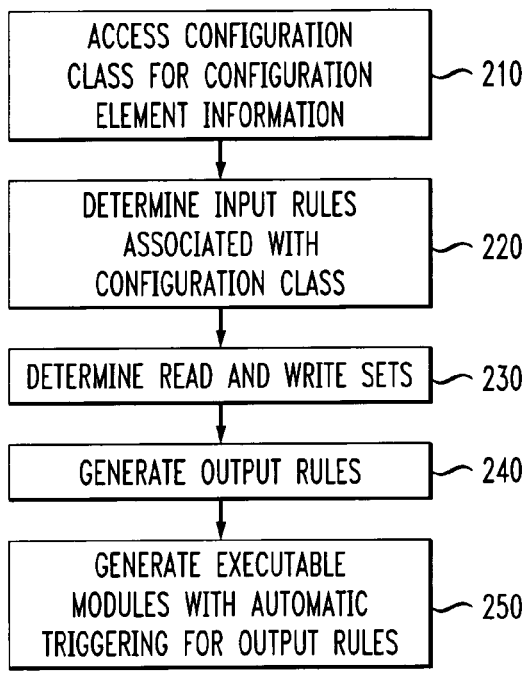

FIG. 3

```
<MOC className="SiteData" MOCVersion="1.0">
    <MOCElement name="server ID">
        <Type>
            <Int32 minValue="1" maxValue="100"/>
        </Type>
    </MOCElement>
    <MOCElement name="serverName">
        <Type>
            <String defaultValue=""/>
        </Type>
    </MOCElement>
    <MOCElement name="serverType">
        <Type>
            <EnumRef name="ServerTypeEnum"/>
        </Type>
    </MOCElement>
    <MOCElement name="serverAttr">
        <Type>
            <Attributes className="ServerComplexType" MOCVersion="1.0"/>
        </Type>
    </MOCElement>
</MOC>
```

FIG. 4

```xml
<Typedef name="PnniAtmAddr"> <!-- a predefined type -->
    <Type>
        <OctetString maxLength="20" minLength="0" />
    </Type>
</Typedef>
<!-- A type defined in terms of another type -->
<Typedef name="ArrayedAtmAddr">
    <Type arrayLength="10">
        <UserDefType name="PnniAtmAddr"/> <!-- type defined above -->
    </Type>
</Typedef>

<!-- this is inside a MOC that uses the above type definition -->
<MOCElement name="atmAddress" visibility="public">
    <Type arrayLength="25">
<UserDefType name="ArrayedAtmAddr"/>
    </Type>
</MOCElement>
```

FIG. 5

```xml
<MOC className="SiteData">
    <ExplicitRule name="iEMS_defaultValueRule"><![CDATA[
        public void iEMS_defaultValueRule()
        {
            serverID = 100;
            serverName = "HCFS1";
            serverType = D_serverType_hcf;
...
        }]]>
    </ExplicitRule>
      <MOCElement name="serverName">
          <ImplicitRule name="iEMS_validationRule"><![CDATA[
              public void iEMS_validationRule()
              {
                  // details of this rule are shown later.
              }]]>
          </ImplicitRule>
      </MOCElement>
    ...
</MOC>
```

FIG. 6

```
public class SiteData_1_0 {
    public int serverType;
    public int server ID;
    public ServerComplexType_1_0 serverAttr = new ServerComplexType_1_0(this, "serverAttr");
    public String serverName;
    ...
}
```

FIG. 7

```
public class SiteData_1_0 //the 1_0 is the version
{
    ...
    public String serverName_get() {
      return this.serverName;
    }
    public int serverType_get() {
      return this.serverType;
    }
    public ServerComplexType_1_0 serverAttr_get() {
      return this.serverAttr;
    }
    public int serverID_get() {
      return this.serverID;
    }
    ...
}
```

FIG. 8

```
public class SiteData_1_0
{
  ...
  public void serverAttr_set(ServerComplexType_1_0 v) throws Exception {
    this.serverAttr = v;
    addToUpdateList("serverAttr", v, null);
  } public void serverName_set(String v) throws Exception {
    this.serverName = v;
    addToUpdateList("serverName", v, null);
  }
  ...
}
```

FIG. 9

```
public class SiteData_1_0
{
  ...
  public void serverName_update(String v) throws Exception {
    this.serverName = v;
    addToUpdateList("serverName", v, null);
  } public void serverAttr_update(ServerComplexType_1_0 v) throws Exception {
    this.serverAttr = v;
    addToUpdateList("serverAttr", v, null);
  }
  ...
}
```

FIG. 10

```
<MOCElement name="serverName">
  <ImplicitRule name="iEMS_validationRule"><![CDATA[
      public void iEMS_validationRule()
      {
      if(serverID < 1 || serverID > 250)
          throw new RuntimeException("serverID length error");
      if(serverType != D_serverType_hcf)
          throw new RuntimeException("serverType error");
      }
   ]]>
  </ImplicitRule>
</MOCElement>
```

FIG. 11

```
public void serverType_set(int v) throws Exception {
    //validate range -- omitted for space
    this.serverType = v;
    addToUpdateList("serverType", new Integer(v) , null);
    addTrigger(this, "serverName_iEMS_validationRule");
}
public void serverID_set(int v) throws Exception {
    //validate range -- omitted for space
    this.serverID = v;
    addToUpdateList("serverID", new Integer(v) , null);
    serverID_iEMS_modificationRule();
    addTrigger(this, "serverName_iEMS_validationRule");
}
```
⎬ 1110

```
public void serverType_update(int v) throws Exception {
    //validate range -- omitted for space
    this.serverType = v;
    addToUpdateList("serverType", new Integer(v) , null);
    serverName_iEMS_validationRule();
}
public void serverID_update(int v) throws Exception {
    //validate range -- omitted for space
    this.serverID = v;
    addToUpdateList("serverID", new Integer(v) , null);
    serverName_iEMS_validationRule();
}
```
⎬ 1120

FIG. 12

```
<MOCElement name="serverID">
  <ExplicitRule name="iEMS_modificationRule"><![CDATA[
      public void iEMS_modificationRule() throws IEMSException {
         try{         // dummy modification rules
              if(serverID == 3)
                      serverName_set("Three");
              if(serverID == 4)
                      serverName_set("Four");
         }
         catch(Throwable t){
              throw new IEMSException(t);
         }
      }
]]>
  </ExplicitRule>
</MOCElement>
```
── 1210

```
public NameValuePair[] triggerAlliEMS_modificationRule() throws Exception {
   NameValuePair[] values = new NameValuePair[1];
   serverID_iEMS_modificationRule();
   values[0] = new NameValuePair("serverID_iEMS_modificationRule", null);
   return values;
}
```
── 1220

FIG. 13

```
<ExplicitRule name="iEMS_defaultValueRule"><![CDATA[
    public void iEMS_defaultValueRule()
    {
      serverID=100;
      serverName="HCFS1";
      serverType=D_serverType_hcf;

...
    }]]>
```
↑ 1310

```
public void iEMS_defaultValueRule()
    {
      serverID=serverID_checkValue(100);//for range and integrity constraint
                                       //preservation
      //record this update to serverID -- omitted for clarity
      serverName=serverName_checkValue("HCFS1");
      //record update to serverName
      serverType=serverType_checkValue(D_serverType_hcf);
      //record update to serverType
    }
```
↑ 1320

AUTOMATED TRANSFORMATION OF SPECIFICATIONS FOR DEVICES INTO EXECUTABLE MODULES

FIELD OF THE INVENTION

The present invention relates generally to electronic devices, and, more particularly, to configuring and maintaining the devices.

BACKGROUND OF THE INVENTION

There are many devices for which an interface is developed and used to configure the devices. For instance, a network device might have an interface table with interface information such as the number of bytes transferred into and out of the device. Additionally, the network device could have a port table that also has some relationship with the interface table. There could also be routing tables or other information for the network device.

Originally, the configuration of network devices and other devices was manually performed. An interface was designed for the device and a programmer accessed the interface to set up or modify the configuration for the device.

Recent attempts to alleviate these problems have been made. It is now possible to describe a network device and its interface by using a data model that is then accessed via, for instance, simple network management protocol (SNMP) commands. The data model can model, for instance, the port table and interface tables and the relationship therebetween. SNMP commands can be used to access the data model and configure the network device.

Even though SNMP has been beneficial, managing a large number of network devices is still labor intensive. For instance, a network device made by one manufacturer may need its own data model and this data model might not be applicable to another network device made by another manufacturer. More importantly, a data model of a network device generally contains many configuration elements. As part of configuring the network device, there is an interplay between configuration elements, and this interplay is not necessarily apparent. For example, a port could be deleted as part of the configuration. Other configuration elements could be affected by the port deletion, and the other configuration elements should be updated based on the port deletion. This process is now performed mainly through heuristics and manual intervention usually on a device by device basis.

A need therefore exists for techniques that make it easier to configure and maintain devices such as network devices.

SUMMARY OF THE INVENTION

The present invention provides techniques for automatic generation of executable modules for devices. An illustrative embodiment has a benefit, among others, of making the device's heterogeneity transparent. For instance, an executable module for a device can have an interface similar to that of an executable module for a completely different device. The executable modules allow easier automation of configuration and maintenance of devices such as network devices.

In an aspect of the invention, there are a number of configuration elements associated with a number of devices. Information about input configuration elements is accessed. An input configuration element is associated with one or more input rules. A set of related configuration elements associated with a device may be also grouped into a configuration class. For example, all information pertaining to an interface entry can be represented as a configuration class containing a number of configuration elements. Thus, the information is generally provided as a configuration class, but this is not necessary. In general, an input configuration element is a variable associated with a device and is part of specifications for that device. A configuration element may also be a configuration class or other complex element associated with a device.

The input rules are also part of specifications for a device and comprise, for example, a set of checks or constraints or both that should be performed before or after a configuration element is accessed. The input rules are generally derived from "domain experts" (typically network specialists). An input rule is usually represented as a set of executable statements. Note that a rule by itself generally cannot execute anything useful; instead, a rule usually executes only when it is executed from an appropriately generated context as part of an executable module (as further explained below). Thus, rules represent "snippets" of operational knowledge that need to be put in the correct context for proper operational semantics associated with element configuration operations.

A determination may be made as to which of the configuration elements could be accessed by the input rules. The accessing of configuration elements by an input rule may be complex. As described in more detail below, an input rule could cause call chains that emanate from the input rule or cause a set of instance chain accesses or both. Output rules are determined by using the accessed configuration elements, the input rules, and the way the input rule manipulates its accessed configuration elements. Regarding the latter, output rules may be determined to deal with modifications to configuration elements, as explained in more detail below. In an illustrative embodiment, each output rule is generally derived from exactly one input rule and corresponds to the same input configuration element associated with that input rule. Output rules may be derived from multiple input rules, if desired.

An executable module is generated that is adapted to access at least a given one of the input configuration elements and to trigger one or more of the output rules corresponding to the given input configuration element.

Thus, in an illustrative embodiment, executable modules can be automatically created, and these executable modules may be used to access configuration elements associated with devices. The devices may be network devices, if desired. The execution environment and the executable module can cause execution of appropriate rules, thereby effecting their action. The executable module usually defines a complete execution context for rules, as part of device configuration.

In another aspect of the invention, read and write sets of configuration elements are determined for input rules. The read and write sets determined from an input rule may require analyzing a call chain emanating from the input rule. The call chain can include calls by the rule to other items, such as additional rules and utility methods. The read and write sets are used to perform triggering of output rules associated with a given configuration class.

A set of instance chain accesses may also be determined for an input rule, and the instance chain accesses may further define the read and write sets of that rule. An instance chain access occurs when a configuration element accessed by the input rule is a complex element, such as another configuration class. The set of instance chain accesses are determined by determining every access by an input rule of a given configuration class to other configuration classes that are complex elements in the given configuration class. In an illustrative embodiment, instance chain accesses are recorded as effective read and write sets of the given configuration class so that triggering can be performed across objects of related classes.

The input rules may be described using one or more rule files. Additionally, the information can comprise range and referential integrity restrictions for the input configuration elements specified as part of its configuration class. Illustratively, a range constraint specifies that a variable is constrained by a set of values, and a referential integrity restriction specifies that a variable is dependent on the state of another variable. In an illustrative embodiment, the output rules, which generally include rewritten forms of input rules, ensure that the range and referential integrity restrictions are usually always met when the input configuration elements accessed in the rule are assigned values, thus preventing inadvertent violation of range and referential integrity restrictions.

In another aspect of the invention, the executable modules comprise modification methods. The modification methods can provide access to the input configuration elements. Additionally, the executable modules can ensure that every configuration element accessed by a rule will have in the modification methods the output rules to be triggered. Moreover, in an illustrative embodiment, every modification method associated with a configuration element also ensures that range and integrity constraints of that configuration element are always enforced during the modification.

BRIEF DESCRIPTION OF THE DRAWINGS

FIG. 2 is an exemplary method for automatic generation of executable modules for devices;

FIG. 3 is an exemplary configuration class specified in extensible markup language (XML) schema format for a sample configuration class;

FIG. 4 is an example illustrating predefined types and type relationships in configuration class schema;

FIG. 5 is an example illustrating some rules of an exemplary configuration class entitled SiteData;

FIG. 6 is an example of part of a Java class generated for the SiteData configuration class specification of FIG. 1 and shows how the configuration class is mapped to a Java class and its configuration elements (e.g., MOCElements) are mapped to equivalent class members of the appropriate Java type;

FIG. 7 is an example of part of a Java class generated for the SiteData configuration class specification of FIG. 1 and shows how the "get" methods access the configuration elements of the SiteData configuration class;

FIG. 8 is an example of part of a Java class generated for the SiteData configuration class specification of FIG. 1 and shows how the "set" methods access the configuration elements of the SiteData configuration class;

FIG. 9 is an example of part of a Java class generated for the SiteData configuration class specification of FIG. 1 and shows how; the "update" methods access the configuration elements of the SiteData configuration class;

FIG. 10 is an example illustrating specific rules generated for the SiteData configuration class specification of FIG. 1 and shows an implicit rule specific to the serverName configuration element;

FIG. 11 illustrates deferred and direct triggering that is created with respect to a rule shown in FIG. 10;

FIG. 12 illustrates a configuration element specific explicit rule for the SiteData configuration class and batch triggering for configuration elements; and FIG. 13 illustrates an input rule and an exemplary output rule corresponding to the input rule.

DETAILED DESCRIPTION

Figure 1:
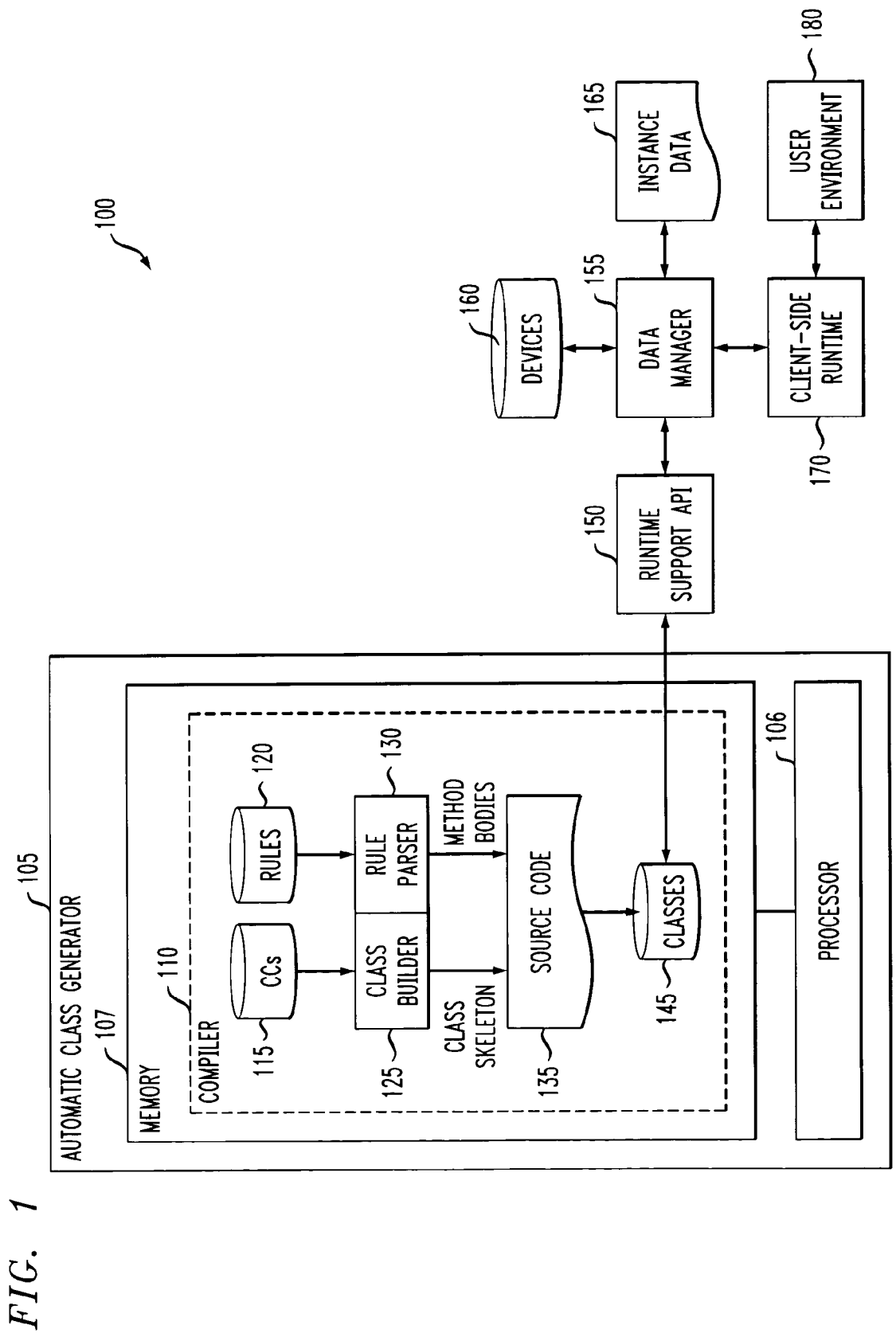
FIG. 1 is a block diagram of a system for generation of executable modules for devices and for using the same, in accordance with a preferred embodiment of the invention.

For ease of reference, the present disclosure is divided into the following sections: Introduction; Specifying Configuration Classes and Rules; Translating Specifications into Executable Modules; and an Example Executable Module Determination Method.

Introduction

The present invention relates to automating the derivation of dynamic behavior from static specifications. For example, it can be used to provide insights into advanced transformation methods in system generation with widely varying applications. As another example, it can be used to optimize the cost and effort of resources needed to realize a system that meets certain specifications. A benefit of the present invention is in automating a certain class of specifications, represented for instance in extensible markup language (XML), into executable modules, thus realizing in whole or part a system that is destined to achieve a set of tasks. Additionally, the present invention can be focused, for instance, on the telecommunications domain to serve as an infra-structure for element management systems (EMS) to facilitate configuration for a wide variety of network equipment models and families.

Configuring today's network devices involves a variety of tasks owing to the complexity of the devices and the networks in which they are deployed. Moreover, device configuration itself requires the management and controlled modification of distributed information. For example, the configuration operations should not violate the range of a configuration element during the operations update if the element has a specified range. Consequently, operations should conserve the constraints, if any, of a configuration element. Further, a modification to a configuration element may also impact some other configuration features of a network device, and can cause an inconsistency. Thus, operations should also take into account the intra-data dependency in a device. For example, an incorrect setting of a port status (e.g., operationalState) configuration element may impact other operations that rely on whether this port is "alive" or not. Therefore, network device configuration requires checking not only the local impacts of a change (e.g., the configuration element the change modifies), but also the global impacts of that change (e.g., at the network device level) that it can cause. Finally, successive or repetitive configuration commands may cause undesirable and perhaps destructive effects. For example, a single 'reset' command may only delete cached information in the memory of a device, but two successive resets (e.g., caused by an inadvertent second reset command following the first) may destroy the secondary storage configuration information, which may even make a network device inoperable.

An approach described herein, in an illustrative embodiment, for device configuration involves modeling devices in terms of two entities: (1) the configuration classes of a device; and (2) the rules that are associated with a class whenever a mutable configuration element of that class is the target of a configuration operation. It should be noted that the terms "rule" and "trigger" are generally considered synonymous in this area. However, for simplicity, the term "rule" will be used more frequently herein. More commonly, the configuration classes may be derived from the simple network management protocol (SNMP) management information bit (MIB) data associated with a device, but SNMP is only one of several sources for data modeling. Any source for data modeling may be used herein.

As explained above, the rules are a set of checks or constraints that one should perform before or after the application of a configuration operation and are derived from the domain experts (e.g., network specialists) and are represented as a set of executable statements. A rule by itself generally cannot execute anything useful. Instead, a rule usually executes only when it is triggered from an appropriately generated context as part of an executable module. Thus, rules represent small portions of operational knowledge that need to be put in the correct context for proper operational semantics associated with element configuration operations. Both the configuration classes and the rules are generally specified using XML. It should be noted that while the translation of SNMP MIB or other device model data into a set of configuration classes in XML can be easily automated, it is hard to automate the invocation (called "triggering") of rules in the precise context in which they apply for a given configuration class. This is because each class-specific rule can perform both intra-class and inter-class related operations, which generally cannot be manually performed.

The present invention can use rules pertaining to a configuration class and the configuration class to create executable modules suitable for configuring and maintaining devices such as network devices. In an illustrative embodiment, executable modules comprise code in a target language (such as C++ or Java), wherein the executable modules provide modification methods to access (e.g., read, write, or modify) configuration elements of a configuration class and wherein the modification methods will trigger output rules that access a configuration element and ensure that range and referential integrity restrictions are met for the configuration element.

Specifying Configuration Classes and Rules

Turning now to FIG. 1, a system 100 is shown for generation of executable modules for devices and for using the executable modules. System 100 comprises an automatic class generator 105, a runtime support application programmer interface (API) 150, a data manager 155, a number of devices 160, instance data 165, a client-side runtime module 170, and a user environment 180. Automatic class generator comprises a processor 106 and a memory 107. The memory 107 comprises a compiler 110 having a number of configuration classes (CCs) 115, a number of input rules 120, a class builder module 125, a rule parser module 130, a source code module 135, and classes 145. It should be noted that configuration classes may be referred to herein as managed object classes (MOCs), and some of the examples shown below use the MOC acronym as part of names for configuration classes.

Configuration management support can generally arise at two levels: (1) the "data manager" level or DM layer that interacts and manages the network devices 160; and (2) the "operations manager" level or OM layer that is used to implement various application or productization related tasks. The OM layer makes use of the facilities provided by the DM layer. The present invention is applicable to both the OM and the DM layers. However, only the DM layer is shown herein, but those skilled in the art will be able to adapt the techniques of the present invention to the OM layer or other layers. Additionally, the devices 160 as described herein are network devices. Nonetheless, any device that may be accessed using an executable module may be a device 160.

In an exemplary embodiment, specifications for a network device 160 are the configuration classes 115 and the input rules 120. The specifications include configuration elements and rules about the configuration elements. The compiler 110 examines the configuration classes 115 and the input rules 120, generally using a number of passes. Each configuration class 115 is a configuration class used to describe characteristics of a device 160. Each input rule 120 pertains to a configuration class 115, and there are generally a number of input rules 120 that are associated with a single configuration class 115. The configuration classes 115 and input rules 120 correspond to devices in the devices 160. A configuration class 115 corresponding to a device 160 specifies the name of the configuration class 115, and a list of configuration elements that are associated with that configuration class 115.

The class builder module 125 uses the configuration classes 115 to create a class skeleton that is passed to source code module 135. The rule parser 130 parses the input rules 120 and generates method bodies that are also passed to the source code module 135. Source code module 135 generates the executable modules, which comprise source code.

The classes 145 can be instantiated as objects (not shown) by the runtime support API 150. The term "executable module" generally includes classes and objects instantiated from the classes. The term may also include any statements, program, object, dynamic link library, linkable file, or driver that can access some data associated with a device. A configuration element comprises any data that can be accessed and that is associated with a device 160, such as a variable, method, configuration class, objects instantiated from configuration classes or other classes, tables, and entries in tables. Generally, a configuration element that is associated with a first device is internal to the first device but may be associated with another device that is in communication with the first device. Accessing includes reading, writing, modifying or some combination thereof. The data manager 155 can execute objects by interacting with the runtime support API 150. The data manager 155 uses instance data 165 to manage objects created from classes 145 and accesses devices 160 when desired. The client-side runtime module 170 interacts with the user environment 180. The user environment 180 allows a network operator to change configuration elements (not shown) for devices 160.

The processor 106 may be singular or distributed and memory 107 may be singular or distributed. The techniques described herein may be implemented through hardware, software, firmware, or a combination of these. Additionally, the techniques may be implemented as an article of manufacture comprising a machine-readable medium, as part of memory 107 for example, containing one or more programs that when executed implement embodiments of the present invention. The programs or a portion thereof may be loaded into processor 106 for execution. The machine-readable medium may be, for instance, a recordable medium such as a hard drive, an optical or magnetic disk, an electronic memory, or other storage device.

Turning now to FIG. 2, a method 200 is shown for generating executable modules for specifications for devices. Method 200 is an exemplary overview of the steps an automatic class generator 105 would take when generating executable modules. More detailed exemplary steps are shown in the Example Executable Module Determination Method section below and described in reference to FIGS. 3 to 12. The specifications, as shown in FIG. 1, are assumed to be two separate files, one of which is a configuration class and the other is a set of rules. In step 210, a configuration class is accessed for configuration element information. In step 220, the input rules associated with a configuration class are determined. Read and write sets of configuration elements, as described in more detail below, are determined in step 230. Steps 220 and 230 analyze input rules to determine read and write sets of configuration elements.

When a rule reads a configuration element or causes a configuration element to be read, the configuration element belongs in the read set for the rule. Similarly, when a rule writes a configuration element or causes a configuration element to be written, the configuration element belongs in the write set for the rule. There could be complex chains of interactions between configuration classes and rules. For instance, one rule may call, in a procedural sense, another rule belonging to the same class. The other rule may read or write additional configuration elements. Moreover, the configuration element accessed by a rule may itself be part of another configuration class. The chains of interaction are automatically determined so that changes to a given configuration element and the output rules to be triggered will be enforced uniformly.

For the read and write sets of configuration elements, output rules are generated in step 240. Step 240 includes creating output rules that ensure that range and referential integrity restrictions are met. The output rules are rewritten forms of the input rules, but also include checks to ensure range and referential integrity restrictions. Executable modules are generated in step 250.

As described above, the configuration class associated with a network device specifies the name of the configuration class, and a list of configuration elements that are associated with that configuration class. The configuration class is a configuration class used to describe characteristics of a network device. For example, FIG. 3 shows an example configuration class describing characteristics of a configuration server named SiteData. This is a configuration class called the "SiteData configuration class" that describes the location information on a server at a given site. The version information (e.g., MOCVersion attribute in FIG. 3) enables one to manage and evolve the configuration classes consistently with device evolutions.

Generally, each configuration class groups a set of configuration elements based on some criteria (e.g., the configuration elements are part of a MIB table) and specifies both the names of the configuration elements and their types. The configuration classes can be broadly categorized into three types: non-table classes, table entries and table classes. The non-table classes are simple classes such as those that model the system level information of a network device. For example, a non-table class might model the System MIB of an IP router containing its contact, location, name, and uptime. A table entry class specifies that its configuration elements are part of a row in a table. For example, every row in an interface table can be viewed as an example of a table entry class. A table class is one that typically contains only one configuration element that is a table entry type (for example, the interface table itself). A table class must exist for every table entry class defined because table entry classes by themselves are often not used in configuration operation, but only in conjunction with a table modification.

The data type of a configuration element in a configuration class can be a primitive type (such as an integer) or it can be a predefined type, with or without restrictions, or it can be a reference to another configuration class. For example, all the configuration elements in FIG. 3 are primitive except the configuration element serverAttr, which is actually another configuration class type. The term "Attributes" is used as a general way of referring to other configuration classes. A user-defined data type can also be defined in terms of another predefined type or an already defined user-defined type, called its base, thus forming a type hierarchy. The user-defined types make data modeling more general, scalable, and flexible. Some examples of type definitions are shown in FIG. 4. FIG. 4 illustrates predefined types and type relationships in the configuration class schema. This example defines a configuration element atmAddress that is a two dimensional array of strings.

Table and table entry configuration classes collectively are used to support table access. A table configuration class specifies a table entry class that forms its rows and a set of primary keys that are used to index into the table. The keys are typically configuration elements of the table entry class referenced in the table class. For example, an interface table configuration class to describe the interfaces MIB can use a table entry configuration class, say called interfaceEntry, that describes the data in each row. The table entry configuration class would typically specify that its configuration element ifIndex, is the primary key to the table. Note that the primary key may be composed of more than one configuration element from the table entry class.

Associated with each configuration class are several rules that need to be invoked as part of configuration operations using the configuration elements of this configuration class. A rule is a method that represents a body of code that is translated into an equivalent output target language code (such as Java or C++) so that it can be executed. A rule is specified in such a way that it can be uniquely identified to a configuration class or to a configuration element of a configuration class or both, if applicable. In an illustrative embodiment, the rules are specified in an XML file. The XML files can be used to specify triggering for both configuration classes and Actions (thus, extending its reuse for both the DM and the OM layer). For example, some of the rules of the configuration class SiteData (shown in FIG. 3) are shown in FIG. 5.

FIG. 5 shows a rule called iEMS_defaultValueRule SiteData. Default value rules are invoked whenever an object of this configuration class is created. FIG. 5 also shows a configuration element specific rule called iEMS_validationRule for configuration element serverType. Some other rules are portrayed later when triggering is described.

Rules specified in a rules file can be classified broadly into the following four types.

(1) Utility Rule. These rules are methods that are invoked by other rules. These are generally not independently invoked as part of a configuration operation, but only in conjunction with some other rule. These are also called Subroutines in the rules file of the specifications. Usually, the subroutines pertain only to a configuration class and not to a specific configuration element of a configuration class.

(2) Direct rule. A direct rule is one that is invoked directly by configuration element modification operations. This triggering is effected automatically by executable modules.

(3) Deferred rule. A deferred rule is one that is recorded in modification operation, but unlike direct rules, they are invoked as a sequence, typically at the end of a configuration session. In an illustrative embodiment, deferred triggering is effected automatically by executable modules. Both direct and deferred rules are called ImplicitRules in the rules file of the specifications. The direct and deferred rules can pertain to a configuration class or can be specific to a configuration element of a configuration class.

(4) Indirect rule. An indirect rule is one that is not explicitly invoked in configuration element modification operations, but are invoked from an external EMS environment using an executable module. An example of this operation would be to create a row in a table. In an illustrative embodiment, these are called ExplicitRules in the rules specification file. They can pertain to a configuration class or can be specific to a configuration element of a configuration class.

A rule r associated with a configuration class M generally contains two sets of configuration elements. The read set comprises of the set of configuration elements of M and configuration elements of other configuration classes that are reachable via an instance chain from M whose values are used but not modified by r. The write set comprises of the set of configuration elements and configuration elements of other configuration classes that are reachable via an instance chain from M whose values are modified by r.

Translating Specifications into Executable Modules

In an exemplary embodiment, a compiler is a two pass translator that translates specifications, generally as XML files with configuration classes and rules, into executable modules that can be utilized by an EMS.

For every mutable configuration element in a configuration class, a compiler in accordance with the present invention generates operations, as part of executable modules, that can modify the configuration element. A configuration element is mutable whenever it can be updated or read by a configuration operation. Moreover, different modification methods may be generated for each configuration element in order to facilitate the different types of triggering. Additional methods may be created that can modify a configuration element that is a configuration element of another configuration class. This happens if the type of a configuration element of a configuration class M is another configuration class, say M', and configuration elements in the class M' are referred by the rules associated with M. For table and table entry configuration classes, methods to facilitate table row creation and modification using its primary key(s) are also generated.

For every configuration element m of a configuration class M, four access methods are generally created: set, get, update, and assign. The methods are prefixed by the configuration element name to disambiguate them since M can have more than one configuration element. The access methods generated also differ slightly depending on whether the type of the configuration element accessed is a scalar or a bounded or infinite aggregate (e.g., array), thus supporting all data type accesses. A rationale for the four access methods above is as follows: (1) the get methods ensure data abstraction and that a configuration element not only can be accessed on a local network node, but also on a remote node; (2) the two types of modification methods set and update are needed because triggering can be direct or deferred (more specifically, set methods defer triggering, while update methods trigger related rules immediately after modifying a configuration element); and (3) the assign methods are generated to simply set a configuration element without any triggering.

If a configuration element of a configuration class M is range restricted, then modification to its value should be constrained by that range. For example, in FIG. 3, the configuration element serverID is a range restricted configuration element whose values must be within 1 and 100. For range restricted configuration elements of a configuration class, an illustrative embodiment of the present invention ensures that the value of the configuration element is always constrained by its specified range. This is done by generating a special validation method which is invoked in every modification method associated with every range restricted configuration element of a configuration class.

To illustrate some of the above aspects, part of the Java class generated for the SiteData configuration class in FIG. 3 is shown in FIG. 6. FIG. 6 shows the mapping of SiteData configuration elements to equivalent Java types. Note that the serverAttr configuration element is mapped to another configuration class type (i.e., ServerComplexType_1_0 is another configuration class whose specification is not shown to conserve space herein).

FIG. 7 shows the get access methods generated for the configuration elements of the SiteData configuration class.

FIG. 8 shows some of the set access methods generated. Some set methods have been omitted that perform triggering with respect to the rules of the SiteData configuration class. These set methods are described later.

Similarly, FIG. 9 shows some of the corresponding update access methods for the configuration elements of the SiteData configuration class. The assign methods are not shown as they are similar to the set and update methods except they do not perform any triggering at all. Instead, an assign method simply sets the value of a configuration element after a range check as needed.

If there are no rules associated with a configuration element of a configuration class, then there is no difference in the generated set, update and the assign methods for this configuration element, but these are rare. Additional support methods, typically needed for object initialization, aggregate access support and runtime support, are also generally created, but in the interest of simplicity these are not shown herein.

To illustrate how triggering occurs in an exemplary embodiment herein, a configuration element specific implicit rule is shown in FIG. 10 for the SiteData configuration class. How the rule is triggered is shown in FIG. 11. The rule in FIG. 10 accesses configuration elements serverID and serverType. Hence, the rule is deferred triggered in the set methods (see reference 1110 of FIG. 11) and direct triggered in the update methods (see reference 1120 of FIG. 11) of these configuration elements, respectively. This ensures that checks performed by this rule are always executed whenever these configuration elements are modified. Note that the triggered rule name in FIG. 11 is prefixed by the configuration element name (serverName) since this is a configuration element specific rule. This ensures that if other configuration element specific rules with the same name (iEMS_validationRule) are defined in the rules definition file, they can be triggered unequivocally. The set methods perform deferred triggering by adding the rule to a queue via a support method addToUpdateList so that they can be executed later. In contrast, the update methods perform direct triggering: the rule is directly invoked as a method call from its body. Also note that for range restricted configuration elements (e.g., serverID) a range check is also performed. The range check methods are not shown herein for clarity.

To generalize, deferred and direct rules for a configuration element m of class C are generated in the modification methods set, update (respectively) of m whenever m is in the read set of one or more rules $r_1, \ldots, r_k$. The k rules are then triggered (e.g., as dictated by the type of triggering) by the modification methods. However, the order in which these rules should be invoked generally requires careful consideration if rules have side effects. For example, if rules $r_1, r_2$ both refer to m, but $r_2$ performs an action that is needed prior to the execution of $r_1$, then $r_2$ should be ordered before invoking $r_1$. Moreover, the rules in M may refer to a configuration element that is accessible through an instance sequence (e.g., via object containment) from M. For example, a rule r may refer to a.b.c where a is an object of some class, say $M_a$, that contains configuration element b which is of type class $M_b$ (for instance) and $M_b$ contains configuration element c. Such accesses are termed instance chain accesses. An instance chain $i_1, i_2 \ldots i_n$ is valid from a class M if $i_1$ is a configuration element of M and for every j, $1 \leq j \leq n$, $i_j$ is a configuration element of ClassOf($i_{j-1}$), and ClassOf($i_j$) contains the configuration element $i_{j+1}$, where the function ClassOf is used to map an object to the configuration class that contains it. Note that for a rule r of configuration class M, that accesses a configuration element a.b.c defined above, the rule should not be invoked from any of the modification methods of configuration class $M_b$ that contains c because objects of $M_b$ do not have access to r defined in M (as per object-oriented semantics). Finally, indirect rules may also be present for M and/or for configuration elements of M, and support is needed for batching their triggering.

To handle rule ordering, read and write sets for a rule are checked and a dependency relationship is formed between the rules. Formally, a rule $r_1$ depends upon rule $r_2$ if and only if (iff) the read set of $r_1$ contains at least one configuration element from the write set of $r_2$. In this case, the relationship between this rule pair is denoted as $r_1 < r_2$. As part of its rule analysis, rule dependency pairs are formed and rules can be ordered in the order of the dependency ensuring that a rule $r_j$ is invoked only after invoking all the rules $r_1, \ldots r_p$ that rule $r_j$ depends upon. If a set of rules $\{r_1, \ldots r_m\}$ that refer to a configuration element m of a class M are to be invoked in m's modification methods, but do not depend upon each other, then the invocation ordering with respect to these rules is arbitrary.

To handle instance chains in the rules of a configuration class M, additional methods are generated called instance chain access methods in M. An instance chain access method is typically named using its component instances and "gluing" them using a language allowed separator that can be used as method names. For example, an instance chain a.b.c would have the following modification methods generated within the referring configuration class: a_b_c_set and a_b_c_update. Within each instance chain access/modification method, the corresponding modification method of the configuration element is invoked followed by the rules, thus achieving the triggering semantics while the configuration element is modified via an object instance of M. For example, a typical structure of the instance chain method a_b_c_update would be as follows.

```
public void a_b_c_update(T v) //assume c's type is T
{
    a.b.c_update(v); //Invoke C's "native" update method
    //Invoke triggers here.
}
```

When indirect rule types (e.g., explicit rules for a configuration class or for its configuration elements) are present for a class M, no action is required as they will be invoked explicitly from object instances of M. However, if indirect rules exist for configuration elements of M, then these indirect rules can form rule groups. If rule groups are present, then the rules that are part of a rule group need to be invoked all at once. For that purpose, indirect rules of configuration elements of M are classified into various groups. A set of indirect rules that are classified into a group share a common characteristic (e.g., in the rules definition file they all have the same name and are configuration element specific). After the grouping, a method of the form triggerAllGroupX is generated for rules in GroupX. Of course, these rules would likely be ordered based on their dependency relationship, if any in triggerAllGroupX because explicit rules can read as well as modify configuration elements of configuration classes.

To illustrate rule grouping, FIG. 12 shows an explicit rule for the serverID configuration element of the SiteData configuration class (see reference 1210). In this case, there is only one rule group and it contains only this rule. The same figure also shows the triggerAlliEMS_modificationRule (see reference 1220) generated as part of the class and the rule is invoked from this method. If EMS_modificationRule explicit rule is also defined for other configuration elements of the configuration class, then they will also be ordered and invoked from this triggerAll method.

To summarize, rule invocation can occur in different scenarios. The description below is with respect to some configuration class M and its rules.

Creation Rule Triggering. Whenever default rules are defined for a configuration class, they are invoked from its constructor. For example, the iEMS_defaultRule defined in FIG. 5 would be invoked from its constructor (not shown).

Immediate Rule Triggering. Whenever a configuration element or a valid instance chain x is referred by a rule r of M, then that rule is invoked directly in the update method of x. See reference 1120 of FIG. 11 for an illustration.

Deferred Rule Triggering. Whenever a configuration element or a valid instance chain x is referred by a rule r of M, then that rule is queued for later execution in the set method of x. See reference 1110 of FIG. 11 for an illustration. These rules are eventually invoked at the end of a configuration session.

Batched Rule Triggering. These are generated for rule groups, if any, of M. For every rule r in a rule group $R_g$, the rules are ordered (e.g., based on their dependency relationship) and invoked from a triggerAll $R_g$ method in M. Such methods are generated for every rule group. These triggerAll methods are invoked by an external EMS environment on an as needed basis. See reference 1220 of FIG. 12 for an illustration.

Prior to generating the rules, rule circularity check is generally performed. The circularity check warns the user if cyclic rules are present. Circularity detection is performed by obtaining the transitive closure of the dependency relationship for each rule to check if this transitive closure contains that rule.

To provide support for other applications that use executable modules, and for deferred triggering, run time support is also provided, generally through an API such as the runtime support API 150 shown in FIG. 1. This runtime support API can be used to access the various configuration classes that have been translated into executable modules and also provides network transparency (e.g., if classes are physically stored in a node in a network that is different from the node from where configuration operations are performed).

Turning now to FIG. 13, an input rule 1310 is shown. Input rule 1310 is also shown in FIG. 5. An output rule 1320 is also shown. Output rule 1320 corresponds to input rule 1310 and includes statements for range and integrity constraint preservation (e.g., in order to ensure that range and referential integrity restrictions are observed). Thus, output rule 1320 includes information from input rule 1310 but also includes additional statements directed toward range and referential integrity restrictions. Output rule 1320 may be used in an executable module, and the executable module can trigger the output rule 1320.

Example Executable Module Determination Method

This section contains exemplary steps for rule detection and processing in order to create executable modules. The steps performed assumes that two passes are performed using input rules because it is generally not possible to generate all the required information and enforce rules in one pass. The order of the steps is only exemplary.

Step 1. In the first pass, all the configuration elements and the configuration class to which they belong are recorded. At the end of the first pass, any type hierarchy in the input is resolved. Type hierarchies are present if the data types of configuration elements of a configuration class are defined in terms of user-defined types. Type resolution resolves all configuration element types to types that are allowable types in the target generated code, such as Java.

Step 2. As part of first pass, range restrictions are specified for configuration elements of a configuration class as well as their types. This is later used to automatically enforce range restrictions for configuration elements.

Step 3. At the second pass, rules associated with every configuration class M are read from the input rule file. To identify rules associated with this configuration class in the rule input file, an Xpath expression is used in the rules file to identify a configuration class tag that contains the name of this configuration class. Under this tag rules of the configuration class as well as the rules of its configuration class configuration elements are defined. Below, this configuration class is referred to as the "current configuration class" (e.g., thus current configuration class is that configuration class whose rules are currently being analyzed).

Step 4. For every rule identified in step 3, the name of the rule and the name specified in the "name" attribute tag are verified to be the same to ensure consistency of rule definition.

Step 5. If a rule is an implicit rule (e.g., as specified by its tag), some rule rewriting is performed to configuration element assignments (such as v=10) if that configuration element is a configuration element of the current configuration class. This is done to ensure specified configuration element ranges (if any) in the configuration class input file are not violated in rules.

Step 6. The contents of the rule are analyzed, as are the call chains emanating from the rule. Call chains emanate from a rule whenever a rule calls (e.g., in the procedural sense) another rule or utility methods.

Step 7. A rule r's read set is determined as follows: every configuration element of the current configuration class whose value is used is recorded; every configuration element, which is a configuration element of the current configuration class, that is used in any utility method or other rule called by rule r is also recorded.

Step 8. If a configuration element, which is a configuration element of the current configuration class, is another configuration class itself (that is, another object or class), then every configuration element access of the contained configuration class is recursively recorded as part of the rule's read set. Such read set accesses are called instance chain accesses.

Step 9. Steps 7 and 8 are repeated but this time to record the rule r's write set: this is done by looking for configuration elements that are updated by the rule r or by any of the methods called by r. Instance chain updates are additionally recorded.

Step 10. A cyclicity check is performed as follows. First, dependency between rules are formed. A rule $r_1$ depends upon rule $r_2$ whenever the rule $r_1$'s read set intersects in a non-empty fashion with the write set of rule $r_2$. After forming the dependency relationship, the transitive closure of this relation is formed to check if a rule depends upon itself, and if so circularity is declared.

Step 11. The actions performed in steps 5-10 are also performed for implicit rules defined for a specific configuration element of the current configuration class.

Step 12. If the rule currently being analyzed is an explicit rule, rule rewriting is performed, as is read and write set derivation and cyclicity analysis. However, for explicit rules that are defined for specific configuration class configuration elements, in addition, the rule type is recorded. Generally, a rule type is definable, but the name of the rule usually serves as its type for simplicity.

Step 13. For every rule analyzed for the configuration class and its configuration elements, a class is generated, in Java for instance, whose name is mapped from the name of the current configuration class and some other attributes (e.g., its version, "base configuration class," etc).

Step 14. The type-resolved configuration elements of the configuration class are generated as configuration elements of the class with appropriate initialization, if specified. The access restriction of the configuration elements of the configuration class is left as whatever user specified and is not changed for security reasons.

Step 15. For every read set configuration element of an implicit rule (e.g., for the current configuration class or for any of its configuration elements), four methods are generated: get, set, update and assign.

Step 15(a). The get method returns a value of a configuration element.

Step 15(b). The set method sets a configuration element value and also checks that this configuration element's range is respected and then invokes every implicit rule that refers to this configuration element as follows: if that implicit rule is defined for the configuration class, then it is invoked with its name; if that implicit rule is specific to a configuration element of the current configuration class, then it is prefixed with the name of that configuration element and invoked. All invocation in the set method is put in a queue and are only executed later. This is called deferred triggering.

Step 15(c). The update method sets a configuration element value and also checks that this configuration element's range is respected and then invokes every implicit rule that refers to this configuration element as follows: if that implicit rule is defined for the configuration class, then it is invoked with its name; if that implicit rule is specific to a configuration element of the current configuration class, then it is prefixed with the name of that configuration element and invoked. All invocation in the update method is directly invoked without delay. This is called direct triggering.

Step 15(d). For every configuration element specific explicit rule of the current configuration class, a method is generated for its type and each one of those rules is invoked. The return value of those rules is also captured and returned to the caller (e.g., if this rule is invoked). This is called batch triggering.

Step 15(e). The assign methods assign a value to a configuration element with range check but does not trigger any rules.

Step 15(f). For every instance chain of the form a.b.c encountered, where "a" is a configuration element of the current configuration class, a_b_c_get, a_b_c_set, a_b_c_update and a_b_c_assign are defined. Any reference to the individual access method to access a.b.c in the rules are rewritten to these generated methods thus isolating access made to configuration elements of contained object (a) with respect to the contained object. The set and update methods of this form first calls the corresponding set or update in the contained object (e.g., a.b.c_set or a.b.c_update) to ensure range check and then invokes any rules of the current configuration class that refers to a.b.c in a deferred or direct manner, respectively. This is a unique feature of the present invention, because this type of triggering is generally not possible in object-oriented programming.

Step 16. The output Java class is then updated with these generated methods and the rules obtained from the rule input file. The rules defined for the configuration class are mapped to a class method with the same name as the rule; the rules defined for configuration elements of the configuration class are mapped to a class method prefixed by the configuration element name to disambiguate if other rules with the same name is present for this configuration class or for its other configuration elements (this convention is beneficial for steps 15(b), and 15(c)).

Step 17. The steps 5-16 are performed for every configuration class.

Step 18. After all the configuration classes are processed the generated class file is compiled and if any errors with respect to the rules are encountered, the corresponding location is identified to aid the rules programmer. If there are no errors, the output is a package that incorporates the rules and automated triggering that can be used by an application as appropriate.

It is to be understood that the embodiments and variations shown and described herein are merely illustrative of the principles of this invention and that various modifications may be implemented by those skilled in the art without departing from the scope and spirit of the invention. The various assumptions made herein are for the purposes of simplicity and clarity of illustration, and should not be construed as requirements of the present invention.

We claim:

1. In a system having a plurality at devices, wherein a plurality or configuration elements are associated with the plurality of devices, a method for automated generation of executable modules associated with the devices, the method comprising the steps of:
    accessing information about one or more input configuration elements of the plurality of configuration elements, wherein the one or more input configuration elements are associated with one or more input rules;
    determining which of the plurality of configuration elements could be accessed based on the one or more input rules;
    generating one or more output rules using at least the accessed information, the accessed configuration elements, and the input rules, wherein an output rule corresponds to one or more input configuration elements and wherein said one or more input rules comprise one or more executable statements; and
    generating at least one executable module adapted to access at least a given one of the input configuration elements and to trigger one or more of the output rules corresponding to the given input configuration element.

2. The method of claim 1, wherein the one or more input configuration elements are described by one or more configuration classes and wherein the one or more input rules are described by one or more rule files.

3. The method of claim 1, wherein the step of determining which of the plurality of configuration elements could be accessed further comprises the step of determining read and write sets of configuration elements for a given one of the one or more rules.

4. The method of claim 3, wherein the step of determining read and rite sets of configuration elements further comprises the step of determining for the given rule a call chain emanating from the given rule.

5. The method of claim 4, wherein the step of determining for a given rule a call chain emanating from the rule further comprises the steps of determining whether the given rule accesses one or more items and determining whether one or more other configuration elements are accessed by the one or more items.

6. The method of claim 5, wherein the one or more items comprise one or more rules or one or more utility methods.

7. The method of claim 5, wherein the step of determining read and write sets of configuration elements further comprises the steps of determining whether the one or more items accesses one or more additional items and determining whether one or more additional configuration elements are accessed by the one or more additional items.

8. The method of claim 1, wherein the step of determining which of the plurality of configuration elements could be accessed further comprise the step of determining, for a given one of one or more configuration elements able to be accessed by an input rule, a set of instance chain accesses for the given configuration element.

9. The method of claim 8, wherein the given configuration element comprises a configuration element of a configuration class, wherein the given configuration element is another configuration class, and wherein the step of determining, for a given one of one or more configuration elements able to be accessed by an input rule, a set of instance chain accesses for the given configuration element further comprises the step of determining every access for the other configuration class to other configuration elements.

10. The method of claim 1, wherein the step of generating at least one executable module further comprises the step of generating at least one class for a given one of the one or more output rules, the at least one class defining the at least one executable module.

11. The method of claim 10, wherein the at least one class comprises one or more statements adapted to access at least one given configuration element that corresponds to the one or more output rules.

12. The method of claim 10, wherein each of the at least one classes comprises one or more methods adapted to access the at least one given configuration element.

13. The method of claim 12, the access comprises reading, writing, or modifying the at least one given configuration element.

14. The method of claim 1, wherein the at least one executable module is adapted to trigger the one or more output rules corresponding to the given input configuration element through deferred triggering of the one or more output rules.

15. The method of claim 1, wherein the at least one executable module is adapted to trigger the one or more output rules corresponding to the given input configuration element through direct triggering of the one or more output rules.

16. The method of claim 1, wherein the at least one executable module is adapted to trigger the one or more output rules corresponding to the given input configuration element through batch triggering of the one or more output rules.

17. The method of claim 3, wherein the one or more output rules comprise two or more output rules, and wherein the method further comprises the step of performing a circularity check by determining dependency relationships between the two or more output rules and by determining whether a given one of the two or more output rules depends upon itself.

18. The method of claim 1, wherein the information further comprises at least one range restriction corresponding to the given input configuration element and wherein the at least one executable module is adapted to ensure that the at least one range restriction is met when the given configuration element accessed by the one or more triggered output rules is assigned a value.

19. The method of claim 1, wherein the information further comprises at least one referential integrity restriction corresponding to the given input configuration element and wherein the at least one executable module is further adapted to ensure that the at least one referential integrity restriction is met when the given configuration element is accessed by the one or more triggered output rules.

20. In a system having a plurality of devices, wherein a plurality of configuration elements are associated with the plurality of devices, an apparatus for automated generation of executable modules associated with the devices, the apparatus comprising:
- a memory; and
- at least one processor, coupled to the memory;
- the apparatus being operative:
  - to access information about one or more input configuration elements of the plurality of configuration elements, wherein the one or more input configuration elements are associated with one or more input rules;
  - to determine which of the plurality of configuration elements could be accessed based on the one or more input rules;
  - to generate one or more output rules using, at least the accessed information, the accessed configuration elements, and the input rules, wherein an output rule corresponds to one or more input configuration elements and wherein said one or more input rules comprise one or more executable statements; and
  - to generate at least one executable module adapted to access at least a given one of the input configuration elements and to trigger one or more of the output rules corresponding to the given input configuration element.

21. An article of manufacture for use in a system having a plurality of devices, wherein a plurality of configuration elements are associated with the plurality of devices, and for automated generation of executable modules associated with the device, the article of manufacture comprising:
- a machine readable medium containing one or more programs which when executed implement the steps of:
- accessing information about one or more input configuration elements of the plurality of configuration elements, wherein the one or more input configuration elements are associated with one or more input rules;
- determining which of the plurality of configuration elements could be accessed based on the one or more input rules;
- generating one or more output rules using at least the accessed information, the accessed configuration elements, and the input rules, wherein an output rule corresponds to one or more input configuration elements and wherein said one or more input rules comprise one or more executable statements; and
- generating at least one executable module adapted to access at least a given one of the input configuration elements and to trigger one or more of the output rules corresponding to the given input configuration element.

* * * * *

UNITED STATES PATENT AND TRADEMARK OFFICE
CERTIFICATE OF CORRECTION

PATENT NO. : 8,356,085 B2
APPLICATION NO. : 10/600995
DATED : January 15, 2013
INVENTOR(S) : Ben Jai, Gokul Chander Prabhakar and Rajeev Rastogi It is certified that error appears in the above-identified patent and that said Letters Patent is hereby corrected as shown below:

In the Claims

Column 15, claim 1, line 31 which reads: "plurality or configuration elements" should read: --plurality of configuration elements--; claim 1, line 35 which reads: "more input con figuration" should read: --more input configuration--; claim 4, line 62 which reads: "read and rite sets of configuration" should read: --read and write sets of configuration--.

Signed and Sealed this
Ninth Day of July, 2013

Teresa Stanek Rea
*Acting Director of the United States Patent and Trademark Office*